Dec. 15, 1964   R. D. WREN, JR   3,161,741
ALTITUDE COMPENSATOR FOR VACUUM CONTROL OF IDLING VALVE
Filed Jan. 19, 1961   3 Sheets-Sheet 1
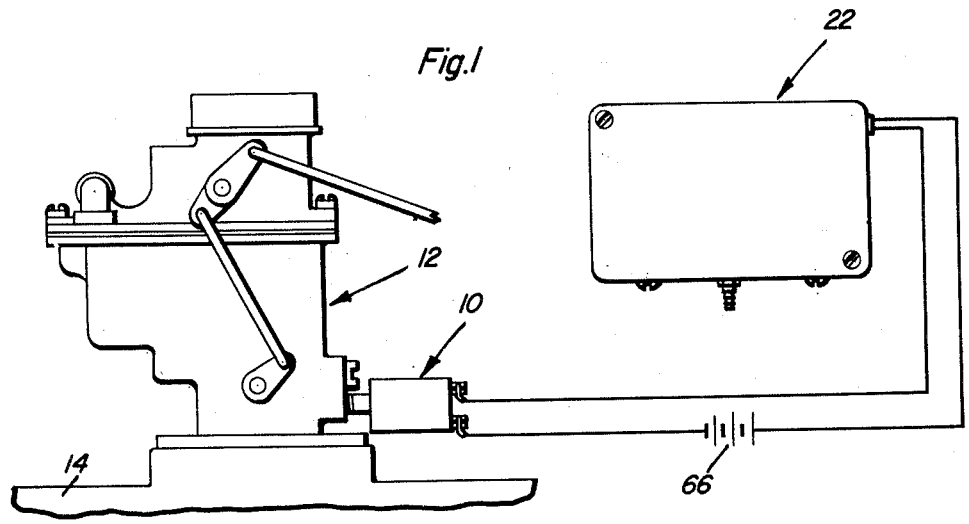
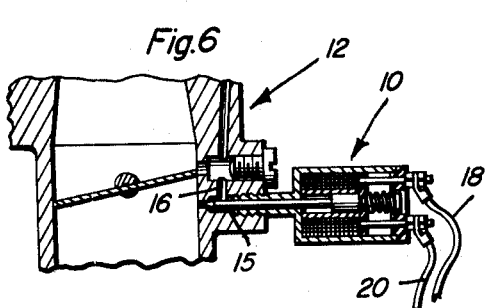
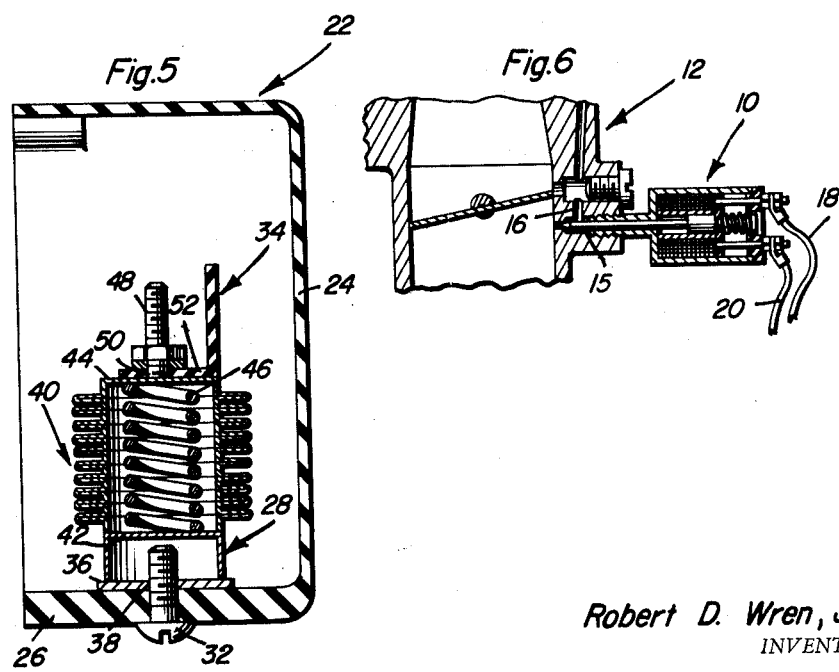
Robert D. Wren, Jr.
INVENTOR.

Dec. 15, 1964  R. D. WREN, JR  3,161,741
ALTITUDE COMPENSATOR FOR VACUUM CONTROL OF IDLING VALVE
Filed Jan. 19, 1961  3 Sheets-Sheet 2
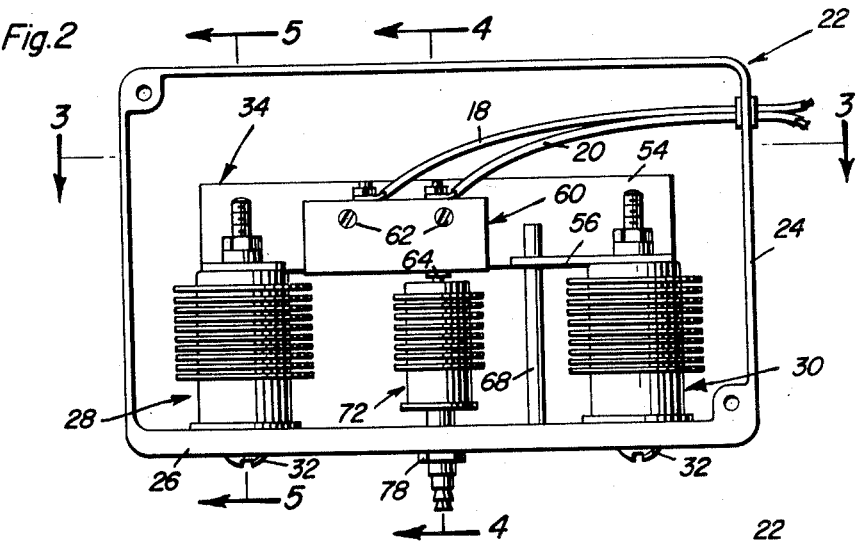
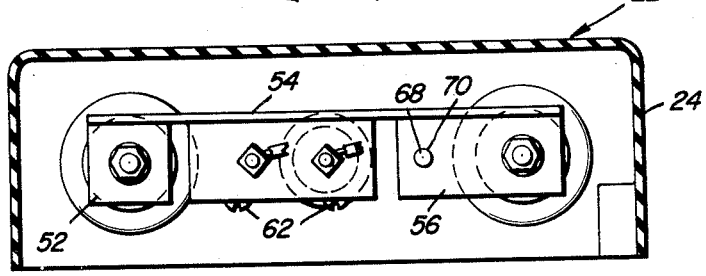
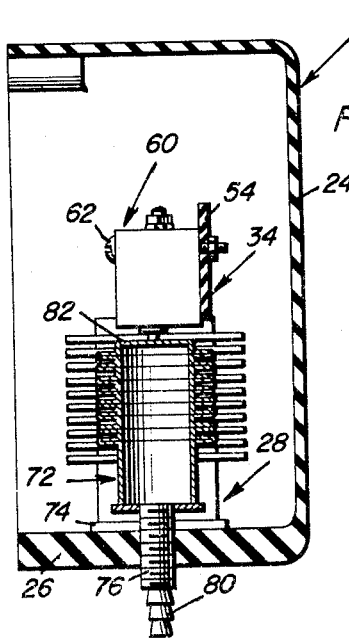
Robert D. Wren, Jr.
INVENTOR.

Dec. 15, 1964    R. D. WREN, JR    3,161,741
ALTITUDE COMPENSATOR FOR VACUUM CONTROL OF IDLING VALVE
Filed Jan. 19, 1961    3 Sheets-Sheet 3
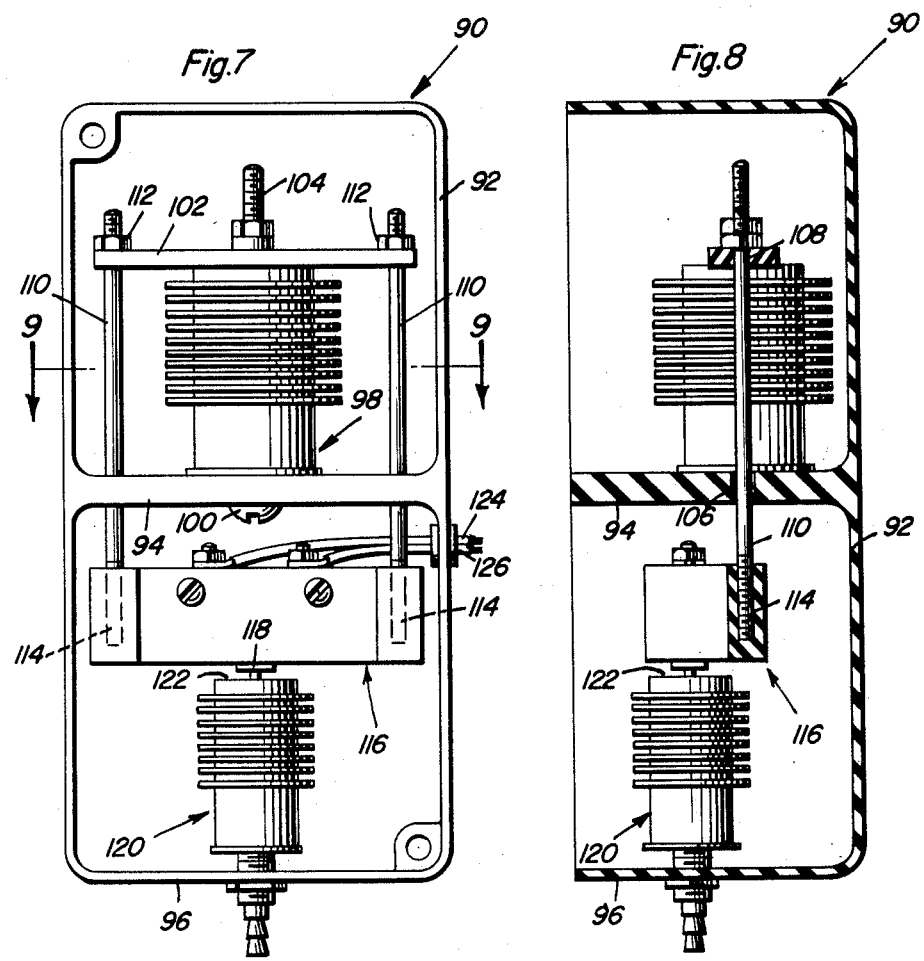
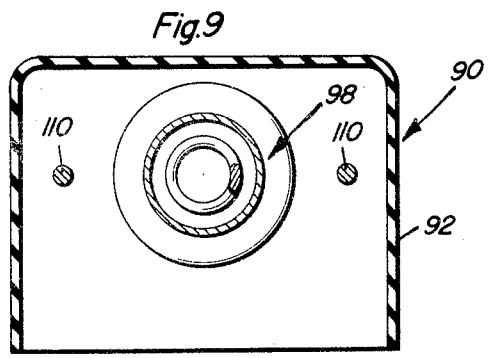
Robert D. Wren, Jr.
INVENTOR.

United States Patent Office 3,161,741
Patented Dec. 15, 1964

3,161,741
ALTITUDE COMPENSATOR FOR VACUUM
CONTROL OF IDLING VALVE
Robert D. Wren, Jr., Compton, Calif.
(13443 Kornblum, Hawthorne, Calif.)
Filed Jan. 19, 1961, Ser. No. 83,796
7 Claims. (Cl. 200—83)

This invention relates to a novel and useful altitude compensator for a vacuum control and more specifically to an altitude compensator adapted to be used in conjunction with a microswitch operatively connected to a solenoid actuated idling valve assembly of a carburetor of an internal combustion engine.

This invention is an improvement on my prior Patent No. 2,859,951, dated November 11, 1958, which discloses a solenoid actuated idle needle valve assembly for an internal combustion engine carburetor specifically adapted to move the needle valve of the carburetor to a closed or semi-closed position when the vacuum in the intake manifold of the internal combustion engine exceeds a certain pre-set limit so that during the deceleration period of the vehicle, while the vehicle is driving the internal combustion engine, the idling fuel passages of the carburetor are temporarily closed to prevent the passage of fuel therethrough which is normally wasted.

The altitude compensator of the instant invention is specifically adapted to compensate for changes in atmospheric pressure and density caused by changes in altitude sufficient to effect the manifold vacuum of an unsupercharged internal combustion engine at a given engine r.p.m.

The intake manifold vacuum of an internal combustion engine in a decelerating vehicle is normally about twenty-five inches of mercury at sea level. This intake manifold vacuum falls to about eighteen inches of mercury at 5000 feet altitude and accordingly, a vacuum actuated idling valve of the type disclosed in my above referred to prior patent should be provided with means for compensating for altitude changes in order that the solenoid operated idle valve will operate efficiently at all altitudes. It is to be understood that the altitude compensator of the instant invention, while being readily adapted for use in connection with solenoid actuated idle valves of vehicle internal combustion engines, may be extremely useful in airplanes, submarines and other vehicles subject to substantial atmospheric or water pressure changes.

The main object of this invention is to provide an altitude compensator for a vacuum control which will be readily adaptable to accurately compensate for changes in the pressure of the ambient atmosphere about the vacuum control in order that a vacuum operated and solenoid actuated idling valve assembly of the carburetor of an internal combustion engine may operate efficiently at substantially all altitudes.

A further object of this invention, in accordance with the immediately preceding object, is to provide an altitude compensator capable of movably mounting a microswitch relative to its vacuum operated actuator in order that the movement of the actuator relative to the microswitch in order to actuate the latter may be maintained substantially constant at different altitudes.

A final object of this invention to be specifically enumerated herein is to provide an altitude compensator which will conform to conventional forms of manufacture, be of simple construction, and substantially automatic in operation so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a portion of an internal combustion engine showing a solenoid actuated idle valve assembly secured to the carburetor thereof and the altitude compensator and vacuum control of the instant invention operatively connected to the idle valve assembly;

FIGURE 2 is a side elevational view on somewhat of an enlarged scale of the altitude compensator and vacuum control of the instant invention shown with the cover removed;

FIGURE 3 is a horizontal sectional view taken substantially upon a plane indicated by the section line 3—3 of FIGURE 2;

FIGURE 4 is a vertical transverse sectional view taken substantially upon the plane indicated by the section line 4—4 of FIGURE 2;

FIGURE 5 is a somewhat enlarged vertical transverse sectional view taken substantially upon the plane indicated by section line 5—5 of FIGURE 2;

FIGURE 6 is a fragmentary enlarged vertical sectional view take through the longitudinal center line of the air passage of the carburetor illustrated in FIGURE 1 and showing the details of construction of the solenoid actuated idle valve assembly;

FIGURE 7 is a side elevational view of a modified form of altitude compensator and vacuum control;

FIGURE 8 is a vertical transverse sectional view taken substantially through the center of the modified form of altitude compensator and vacuum control illustrated in FIGURE 7; and FIGURE 9 is a horizontal sectional view taken substantially upon the plane indicated by section line 9—9 of FIGURE 7.

Referring now more specifically to the drawings, the numeral 10 generally designates a solenoid actuated idle valve assembly for the carburetor which is generally designated by the reference numeral 12. The carburetor 12 is mounted on the intake manifold 14 of the internal combustion engine (not shown) and the solenoid actuated idle valve assembly 10 is mounted on the carburetor 12 with its needle valve 15 disposed to control the flow of fuel through the idling fuel passage 16 of the carburetor 12. Inasmuch as the specific construction of the solenoid actuated idle valve assembly 10 is conventional and is specifically set forth in my above referred to prior patent, further explanation of the construction and operation of the solenoid actuated idle valve assembly 10 will not be set forth. However, it is to be noted that the idle valve assembly 10 is actuated to close the fuel passage 16 upon the passage of electrical current through the conductors 18 and 20.

Referring now more specifically to FIGURES 2 through 5 of the drawings it will be seen that the altitude compensator and vacuum control for the needle valve assembly 10 is generally designated by the reference numeral 22. The altitude compensator and vacuum control 22 includes a housing 24 which defines an elongated support member 26. A pair of identical evacuated bellows members generally designated by the reference numerals 28 and 30 have their lower ends secured to the support member 26 by means of a suitable fastener 32.

The upper ends of the bellows members 28 and 30 have an elongated mounting member generally referred to by the reference numeral 34 secured therebetween whereby the mounting member 34 is supported solely by the upper ends of the bellows members 28 and 30.

With attention now directed to FIGURE 5 in particular, it will be noted that each of the bellows members 28 and 30 includes a mounting base 36 which is suitably apertured as at 38 to receive the shank of the fastener 32. The bellows member 28 includes an upper bellows section 40 generally referred to by the reference numeral 40 defined by a bottom wall 42 and a top wall 44. A compression spring 46 is disposed between the bottom and top walls 42 and 44 and resiliently urges the bottom and top walls away from each other. However, the bellows section is substantially evacuated of all gases and the pressure of the ambient atmosphere tends to compress the bellows section 40 and urge the bottom and top walls 42 and 44 toward each other. The top wall 44 has a stud 48 secured thereto which projects upwardly therefrom and passes through an aperture 50 formed in a first horizontal leg 52 of the mounting member 34.

Thus, the mounting member 34 is lowered toward the support member 26 upon an increase of atmospheric pressure and is moved away from the support member 26 upon a decrease of atmospheric pressure.

As can best be seen in FIGURE 3 of the drawings, the mounting member 34 includes an upstanding leg 54 the first horizontal leg 52 and a second horizontal leg 56. The upper end of the bellows member 28 is secured to the horizontal leg 52 and the upper end of the bellows member 30 is secured to the horizontal leg 56.

A microswitch assembly generally referred to by the reference numeral 60 is secured to the vertical leg 54 by means of fasteners 62 and includes a movable actuator 64 which may be urged upwardly to open circuit between the conductors 18 and 20 within the microswitch assembly 16.

It is to be noted that either one of the conductors 18 and 20 may have a suitable source of electricity connected thereto such as battery 66, see FIGURE 1.

The support member 26 includes an upstanding guide rod 68 and the horizontal leg 56 is apertured as at 70 and slidingly embraces the upper end of the guide rod 68.

The vacuum control includes a vacuum responsive operating means in the form of a bellows member generally designated by the reference numeral 72.

With attention now directed more specifically to FIGURE 4 of the drawings it will be noted that the bellows member 72 includes a base 74 through which a threaded shank portion 76 extends. The shank portion 76 is secured through the support member 26 by means of a threaded fastener 78, see FIGURE 2, and the threaded shank 76 is adapted at its lower end for securement to one end of a vacuum line as at 80. The upper end of the bellows member 72 terminates in an upper wall 82 which is adapted to abut the movable actuator 64 in order to open the electrical circuit to the solenoid actuated idle valve assembly 10.

The lower end portion of the shank 76 is adapted to be connected to the intake manifold 14 by any suitable means such as a flexible vacuum line (not shown) for communicating the interior of the bellows member 72 with the interior of the intake manifold 14.

In operation, the altitude compensator and vacuum control is adapted to close the electrical circuit to the solenoid actuated idle valve assembly 10 defined by electrical conductors 18 and 20 upon movement of the top wall 82 of the bellows member 72 downwardly away from the microswitch assembly 62 thus enabling the movable actuator 64 to move downwardly in order to close the electrical circuit to the idle valve assembly 10. In addition, a decrease of the pressure of the ambient atmosphere the bellows members 28 and 30 will be extended in length thus raising the mounting member 34 relative to the support member 26 and decreasing the distance the top wall 82 of the bellows member 72 has to move downwardly in order to enable sufficient downward movement of the movable actuator 64 to close the electrical circuit to the idle valve assembly 10. Thus, when the pressure of the ambient atmosphere is lowered less vacuum is required to actuate the closing of the fuel passage 16 by means of the idle valve assembly 10. The bellows members 28 and 30 are evacuated in order that the length thereof will not be effected by temperature changes but only by altitude changes or atmospheric pressure changes.

Referring now more specifically to FIGURES 7 through 9 of the drawings it will be seen a modified form of altitude compensator and vacuum control generally referred to by the reference numeral 90 which includes a case or housing 92. The support member of the housing 92 is designated by the reference numeral 94 and a second support member is designated as at 96. The first support member has the lower end of a bellows member generally designated by the reference numeral 98 secured thereto by means of a fastener 100. The bellows member 98 is substantially identical in construction to the bellows member 28 and 30.

The mounting member is designated by the reference numeral 102 and comprises an elongated member secured at its mid-portion to the bellows member 98 by means of its mounting stud 104. The first support member 94 is apertured as at 106 and the opposite ends of the mounting member 102 are provided with bores 108 through which the upper ends of guide rods 110 are secured by means of suitable fasteners 112. The lower ends of the guide rods 110 are threaded and threadedly engaged in threaded blind bores 114 formed in the microswitch assembly which is generally designated by the reference numeral 116. The microswitch assembly 116 also includes a movable actuator which is referred to by the reference numeral 118.

It will be noted that only a single bellows member 98 is utilized to support the microswitch assembly 116 and that the vacuum responsive operating means in the form of a bellows member 120 is secured to the second support member 96 is a manner substantially identical to the manner in which the bellows member 72 is secured to the support member 26. The upper end wall 122 of the bellows member 120 is positioned to engage the actuator 118 upon a decrease in vacuum within the intake manifold to which the bellows member 20 is operatively connected in order that the microswitch 116 may be actuated to open the circuit defined by the conductors 126 to the idle valve assembly whereupon the fuel passages controlled thereby may be opened. The bellows member 98 is also evacuated and therefore responds only to pressure differences and not to temperature differences.

It may be appreciated that the operation of the altitude compensators 22 and 90 are substantially identical with the excepion that a pair of supporting bellows members 28 and 30 are used in the altitude compensator and vacuum control 22 whereas only a single bellows member 98 is used in the altitude compensator and vacuum control 90.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An altitude compensator for a vacuum control, said compensator comprising a support member and a mounting member, a plurality of means secured between said members at corresponding spaced points thereon mounting said members for relative movement toward and away from each other and including at least one fluid pressure-responsive extensible means extending between said members and operable in response to ambient pressure changes to vary the distance between said members, switch means supported from said mounting member between two of said mounting means and including an actuator movable relative to said mounting member toward said support member, vacuum responsive operating means carried by said support member and including a portion movable toward and away from and engageable with said actuator, and means adapting said vacuum responsive means for communication with a source of vacuum.

2. An altitude compensator for a vacuum control comprising a first support member, a mounting member, ambient atmospheric pressure responsive means mounting said mounting member on said first support member for movement toward and away from a portion of said support member in response to changes in atmospheric pressure, switch means having a movable actuator, means securing said switch means to said mounting member, vacuum responsive operating means carried by a second support member supported from said first support member, said operating means including a portion movable toward and away from and engageable with said actuator, means on said vacuum responsive operating means adapted to be connected to a source of vacuum, said ambient compensating pressure responsive mounting means including a bellows member secured between said first support member and said mounting member, said securing means comprising a pair of parallel guide rods fixed at one pair of corresponding ends to said mounting member at points spaced therealong and on opposite sides of said bellows member, said switch means being supported in fixed relation to and with said actuator disposed between the other pair of corresponding ends of said rods, said vacuum responsive means being carried by said second support member with said movable portion thereof disposed in alignment with and in the path of movement of said actuator for engagement therewith.

3. The combination of claim 2 wherein said support members comprise two spaced support elements one of which defines an elongated element, said elongated element having a pair of spaced parallel bores formed therethrough slidably receiving and guiding said guide rods intermediate their ends.

4. An altitude compensator for a vacuum control comprising an elongated support member, an elongated mounting member, a pair of upstanding supporting closed bellows members fixedly secured at their lower ends to said support member at a point spaced longitudinally therealong, means fixedly securing the opposite end portions of said mounting member to the upper ends of said bellows members, switch means fixedly supported from said mounting member between said bellows members and including an actuator mounted for movement relative to said mounting member toward and away from said support member, vacuum responsive operating means carried by said support member and including a portion movable toward and away from said actuator and in alignment with the movement of the latter, and means adapting said vacuum responsive means for securement to a source of vacuum.

5. The combination of claim 4 including guide means rigidly connected with said support member and engageable with said mounting member for guiding the movement of the latter toward and away from said support member.

6. The combination of claim 4 wherein said vacuum responsive operating means comprises a third bellows member fixedly secured at one end to said mounting member and in alignment with said actuator in the direction of its movement with the other end of said operating bellows member adapted for engagement with said actuator.

7. The combination of claim 6 including guide means carried by said mounting member and engageable with a portion of said support for guiding movement of said mounting member relative to said support member.

References Cited in the file of this patent

UNITED STATES PATENTS

| | | |
|---|---|---|
| Re. 25,093 | Johanson et al. | Dec. 5, 1961 |
| 1,233,746 | Bendixen | July 17, 1917 |
| 1,956,004 | Carson | Apr. 24, 1934 |
| 2,283,175 | Berger | May 19, 1942 |
| 2,427,426 | Swenson et al. | Sept. 16, 1947 |
| 2,427,900 | Camilli et al. | Sept. 23, 1947 |
| 2,479,616 | Hasselhorn | Aug. 23, 1949 |
| 2,480,495 | Mejean et al. | Aug. 30, 1949 |
| 2,557,929 | Baak | June 26, 1951 |
| 2,814,688 | Kutzler | Nov. 26, 1957 |
| 2,943,167 | Hughes et al. | June 28, 1960 |